Patented July 28, 1936

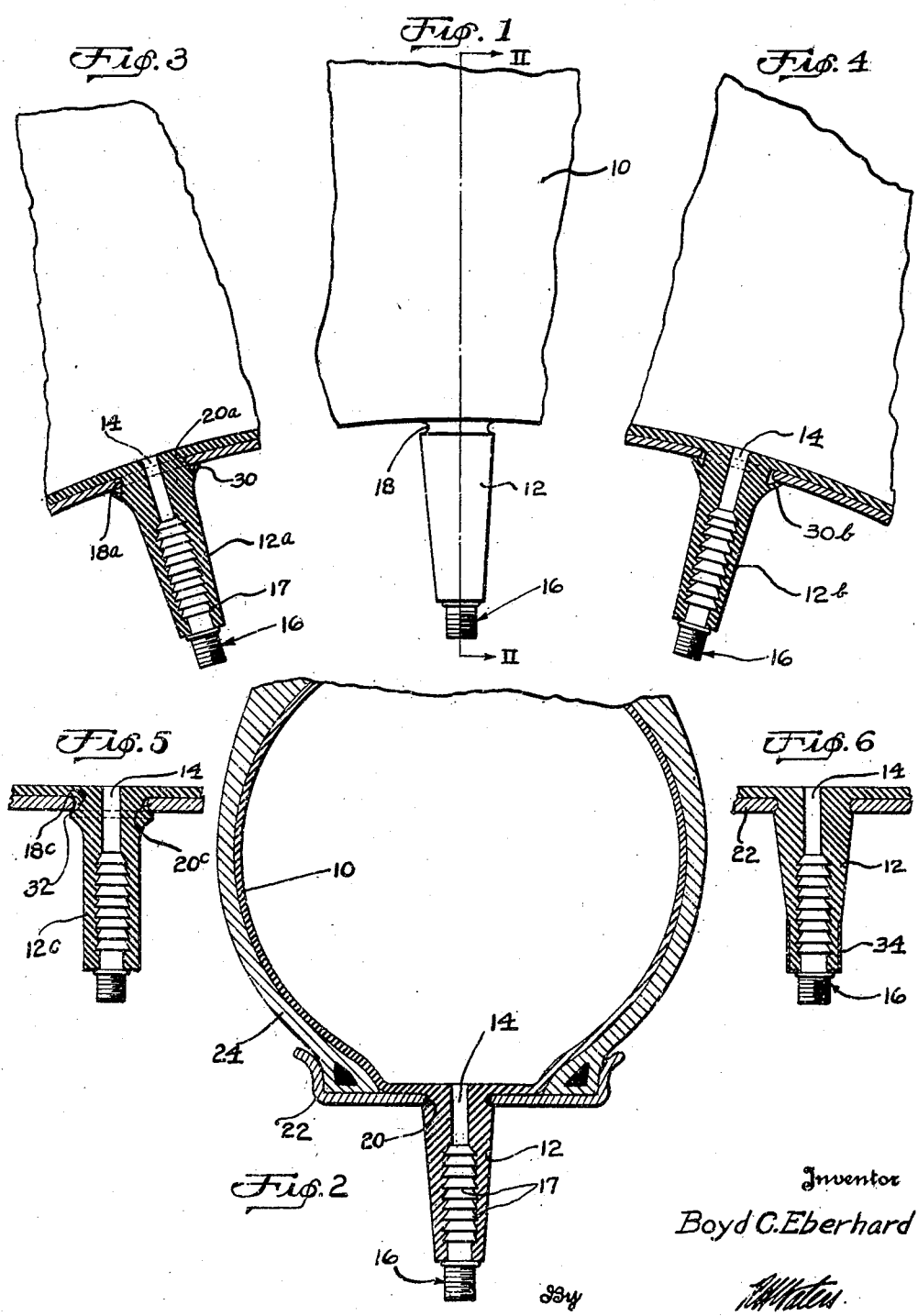

2,049,252

UNITED STATES PATENT OFFICE 2,049,252

FLEXIBLE VALVE STEM

Boyd C. Eberhard, Akron, Ohio, assignor to Wingfoot Corporation, Wilmington, Del., a corporation of Delaware Application May 9, 1932, Serial No. 610,000

13 Claims. (Cl. 152—12)

The present invention relates to valve stems for inner tubes, or the like, and more particularly to flexible rubber valve stems.

It is an object of the present invention to provide a flexible rubber valve stem for inner tubes, or the like, which is provided with means for sealing between the valve stem and the tire receiving rim.

Another object of the invention is to provide a flexible valve stem, which is adapted to be held in the rim so that the stem will not pull out of the rim hole while the tire is being mounted upon the rim.

Another object of the invention is to provide a flexible valve stem of the type described, wherein the stem is provided with a circular groove near the base thereof, which is adapted to engage with the rim so that the stem will normally be held in the rim.

Another object of the invention is to provide a self-sealing and self-retaining flexible valve stem upon a rubber inner tube, or the like.

Another object of the invention is to provide a new and improved flexible rubber valve stem, which is inexpensive in manufacture and rugged and efficient in operation.

For a better understanding of the invention reference may now be had to the accompanying drawing wherein:

Fig. 1 is a side elevation of a portion of an inner tube illustrating a flexible rubber valve stem embodying the present invention;

Fig. 2 is a transverse sectional view taken on line II—II of Fig. 1, illustrating the tube incorporated in a tire and rim assembly;

Fig. 3 is a fragmentary sectional view of another form of the invention taken in the circumferential plane of the tire, tube and rim assembly;

Fig. 4 is a view similar to Fig. 3 of another form of the invention;

Fig. 5 is a fragmentary view similar to Fig. 2 of another form of the invention; and Fig. 6 is a view similar to Fig. 5 of another form of the invention.

Referring to Figs. 1 and 2 of the drawing, the numeral 10 indicates an inner tube of any desired form or characteristic, to which is secured, preferably by integral vulcanization therewith, a flexible rubber valve stem 12. The valve stem is provided with the usual axial bore 14 in the end of which is mounted a metal valve indicated generally at 16, which may be formed with anchoring flanges 17 or the like if desired. The metal valve 16 is preferably of such a length the flexibility of the stem will not be impaired. The rubber stem 12 is preferably formed exteriorly with a slight taper, as indicated in the drawing, which facilitates ready insertion in and removal from the rim. The valve stem 12 may or may not, be reinforced with suitable fabric, as is found necessary or desirable.

In the embodiment of the invention illustrated in Figs. 1 and 2, the valve stem 12 is formed with a circular channel or groove 18 around the base thereof, which is adapted to cooperate with the usual opening 20 in a rim 22, upon which is mounted a tire 24.

One of the undesirable features of rubber valve stems heretofore in use was that considerable difficulty was experienced in retaining the valve stem in the rim hole when the tire and tube were being mounted upon the rim. The stem was very apt to slip out of the hole and down in the inside of the tire so that the tire and tube had to be removed and the operation repeated. With the flexible rubber valve stem comprising the present invention, this difficulty has been substantially eliminated, in that the rubber stem after it is once pulled into the rim hole 20, will be normally held in the hole through the agency of the groove 18, so that the tire can be worked upon the rim without fear that the valve stem will be lost inside the tire.

At the same time, the stem will not be held so tightly in the hole that there will be any danger of tearing the stem when it is pulled out of the hole, in case it is desired to remove the tube from the rim. Moreover, in certain instances, it becomes quite desirable that the valve stem pull out of the hole. This situation may arise when it is necessary to run the tire deflated for any distance. If the stem is positively held in the rim hole, it is very apt to be pulled away from the remaining portion of the tube, with a resulting destruction of the tube. On the other hand, with the valve stem comprising the present invention, under such circumstances, the valve stem will pull out of the rim hole and being flexible will not cause any serious damage to the tire or tube, even though the tire is run deflated for some distance.

In addition to functioning as above set forth, the relation of the valve stem and rim hole is such that the rim hole is very substantially sealed against entrance of water, sand, or other foreign matter. This is because the valve stem is molded or formed at the channel 18 with a diameter slightly larger than the rim hole 20 so that a slight compression of the rubber around the hole will occur.

In the form of the invention illustrated in Fig. 3, the valve stem 12a has been provided with a circular flange-like lip 30 which functions to seal the valve stem and rim, and also to hold the valve stem in position, in addition to the regular seal and lock provided by the groove 18a and rim hole 20a. The flange 30, being of resilient flexible rubber, can be easily pulled down through the rim hole 20a without any serious results. The double seal and lock provided by this form of the invention may be desirable in certain instances, particularly upon larger size tires and rims, and also where the sealing action is rather necessary, for example, in desert travel or the like.

The embodiment of the invention illustrated in Fig. 4 is very similar to that illustrated in Fig. 3, except that the base of the valve stem 12b is not provided with the groove 18a, but relies solely upon the flange 30b for sealing and retaining purposes. While the flanges 30 and 30a are preferably in the form of lips the invention contemplates making flanges or abutments in the form of half round or other shaped rings or shoulders.

Fig. 5 illustrates another type of valve stem wherein the stem 12c is substantially straight throughout its length. The stem is formed with a rounded flange 32 which provides a groove 18c on the stem which is adapted to engage with the edges of the rim hole 20c.

The embodiment of the invention illustrated in Fig. 6 is provided with a metal ferrule or band 34 which strengthens and supports the end of the stem. The ferrule also functions to insure a leakproof connection between the valve stem 12 and the metal valve 16 and will substantially prevent the two from being pulled apart. This stem differs from the stems shown in the other figures of the drawing in that it is merely formed with a taper which co-operates with the rim hole to wedge the stem in the hole. The base of the stem is greater than the diameter of the hole so that the rim will form a groove around the base of the stem as shown in Fig. 6 when the stem is pulled into the hole.

From the foregoing it will be apparent that a flexible rubber valve stem has been provided, which is adapted to be normally securely retained in the rim hole, and in which the stem is very positively sealed in the rim, so that it is impossible for water, or other foreign material, to pass down between the valve stem and rim.

Although I have illustrated and described only the preferred forms which the invention may assume, and have described those forms in detail, it will be apparent to those skilled in the art that the invention is not so limited but that various modifications may be made therein without departing from the spirit of the invention or from the scope of the appended claims.

What I claim is:

1. An inner tube for pneumatic tires comprising a body portion, a flexible valve stem secured to the body portion, said stem being adapted to extend through a hole in the tube mounting rim and having a groove adapted to be received in the rim hole whereby the valve stem is held in the hole in sealed relation with the rim, and a flexible lip on the valve stem above the groove, which lip is adapted to be in contact with the rim to give an added seal.

2. An inner tube adapted to be placed in a tire and mounted on a rim comprising a body portion, a flexible valve stem secured to the body portion, said stem being formed with a taper to decrease the diameter of the stem towards it free end, said stem being adapted to extend through a hole in the rim and having adjacent its inner end a groove adapted to be received snugly in the rim hole, whereby the valve stem is held in the hole in sealed relation with the rim.

3. A tire valve comprising a tubular elastic portion of a diameter to pass through the valve stem opening in a wheel rim, said tubular portion having parts thereof for engagement with the wheel rim in proximity to the valve stem opening therein for normally preventing the withdrawal of the valve stem through said opening when the valve stem has been inserted through said opening.

4. A tire valve comprising a tubular elastic portion of a diameter to pass through the valve stem opening in a wheel rim, said tubular portion having a part thereof of normal diameter greater than the opening in the wheel rim through which said valve stem is intended to extend for engagement with the wheel rim in proximity to the valve stem opening therein for normally preventing the withdrawal of the valve stem through said opening when the valve stem has been inserted through said opening.

5. A tire valve comprising a tubular elastic portion of a diameter to pass through the valve stem opening in a wheel rim, said tubular portion being of frusto-conical form having a normal maximum diameter greater than the opening in the wheel rim through which said valve stem is intended to extend for engagement with the wheel rim in proximity to the valve stem opening therein for normally preventing the withdrawal of the valve stem through said opening when the valve stem has been inserted through said opening.

6. A valve stem of flexible material having an extension, which extension is located between the ends of the valve stem and is adapted to be compressed to permit the valve stem to be drawn through the valve stem opening in a rim and to then expand into engagement with the inner side of the tire rim to retain said stem normally in extended position.

7. A valve stem adapted to be connected to the inner tube of a tire and to extend through the usual opening in the tire rim, said stem being formed of flexible material and tapering inwardly from adjacent its inner end to its outer end and provided with a portion of a diameter such as to extend across said opening and overlie the inner side of the rim to maintain said stem normally in extended position.

8. A valve stem adapted to be connected to the inner tube of a tire and to extend through the usual opening in a tire rim, said stem being formed of flexible material and tapering inwardly from adjacent its inner end to its outer end and provided adjacent such inner end with a laterally extending portion of a diameter such as to extend across said opening and overlie the inner side of the rim to maintain said stem normally in extended position.

9. A valve stem adapted to be connected to the inner tube of a tire and to extend through the usual opening in the tire rim, said stem being formed of flexible material and decreasingly tapered from adjacent its inner end to its outer end and provided adjacent such inner end with a laterally and inwardly directed extension of a diameter such as to extend across said opening and overlie the inner side of the rim to maintain said stem normally in extended position.

10. A valve stem adapted to be connected to the inner tube of a tire and to extend through the usual opening in the tire rim, said stem being formed of flexible material and decreasingly tapered from adjacent its inner end to its outer end and provided adjacent such inner end with a laterally and inwardly directed extension having a beaded outer edge and of a diameter such as to extend across said opening and overlie the inner side of the rim to maintain said stem normally in extended position.

11. A valve stem adapted to be connected to the inner tube of a tire and to extend through the usual opening in the tire rim, said stem being formed of flexible material and having at its inner end a head adapted to be arranged within the tube and having outwardly of said inner end a portion cooperating with said head to form a recess therebetween, said recess being adapted to receive the edge of the tire rim opening and said portion being adapted to overlie the inner side of the rim to maintain said stem normally in extended position.

12. The combination with a tire casing, inner tube and tire rim provided with an opening, of a valve stem of flexible material extending through said opening and having at its inner end a head secured to the tube interiorly thereof and also having a portion outwardly of said head cooperating therewith to form a recess therebetween receiving the edge of the rim opening, said portion overlying the inner side of the rim and normally maintaining the stem in extended position.

13. A valve stem adapted to be connected with the inner tube of a tire and to extend through the usual opening in the tire rim, said stem being formed of flexible material and having at its inner end a head adapted to be arranged within the tube and having outwardly of said inner end a laterally and inwardly directed portion forming a cup-shaped extension facing said head, the space between said extension and said head being adapted to receive the edge of the tire rim opening and said extension being adapted to overlie the inner side of the rim to maintain said stem normally in extended position.

BOYD C. EBERHARD.